Patented Oct. 30, 1934

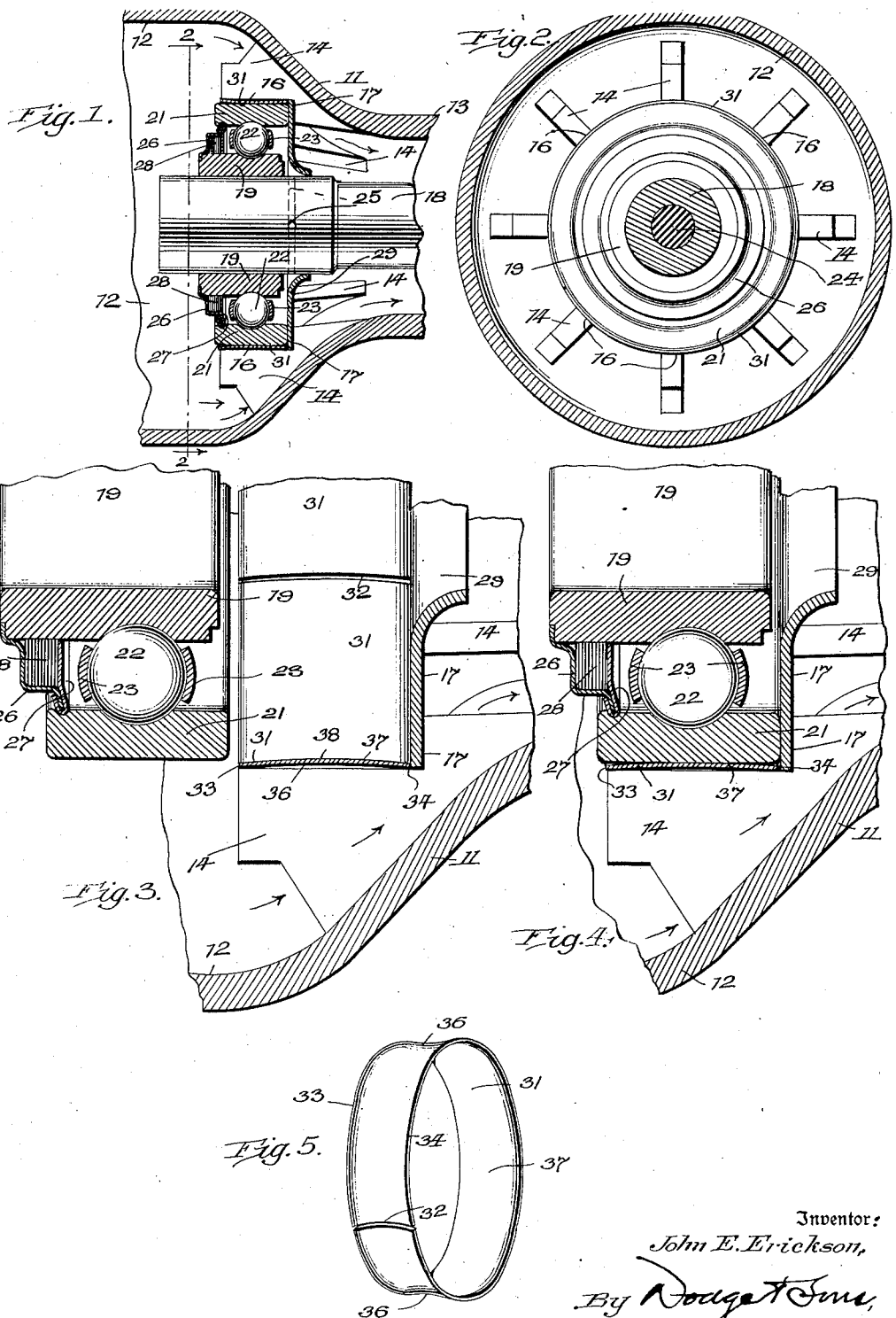

1,978,527

UNITED STATES PATENT OFFICE 1,978,527

SHIM

John E. Erickson, Madison, Wis., assignor to Madison-Kipp Corporation, Madison, Wis., a corporation of Wisconsin Application May 25, 1932, Serial No. 613,509

6 Claims. (Cl. 308—236)

The present invention relates to shims, and has for its object the provision of an improved form of shim which is adapted to retain an article or member securely in the seat which it occupies in a supporting body.

Primarily, the invention is concerned with the mounting and securing of ball roller or like bearing assemblies in place in their supports, and seeks to provide an efficient retaining device for this purpose. It will be understood, however, that the device is not limited to use with anti-friction bearing assemblies, but may be utilized generally for securing articles or members of various sorts in their supports or bearings.

In mounting ball bearing assemblies in their supporting bodies, it has been found that, although pressed firmly into place in their supports, the bearing assemblies frequently become loose after a while, and, if not otherwise secured, may even fall out of their mountings. This trouble is encountered particularly in the mounting of ball bearing assemblies in die cast supporting bodies, in which case the cast body is formed of a metal softer than that of the ball bearing assembly. The loosened condition of the bearing assembly, which, obviously, is highly detrimental to the life of the ball bearings is a result of the gradual enlargement of the recess or opening in which the bearing assembly is located. Such enlargement is caused principally by the varying load under which the bearing operates, and the fact that there is a slight "growth" of the metal-supporting body over a period of time.

It is the purpose of this invention to furnish a simple, easily insertible retaining annulus or shim, whereby any object, particularly a ball bearing assembly or the like, may be firmly and rigidly secured in its supporting recess or seat. The retaining annulus is designed not only initially to hold the bearing assembly rigidly in place, but the annulus is of a limited resilient nature, so that it functions automatically to compensate for any looseness which may tend to occur and thereby maintains the bearing assembly fixedly in place.

A further object is to furnish a device of the above type which may be quickly manufactured in large quantities, and, hence, marketed at a reasonable price.

A practical embodiment of the invention, as now used, appears in the accompanying drawing, wherein:—

Fig. 1 is a longitudinal sectional view showing my improved retaining shim applied to the mounting of a ball bearing assembly or unit which supports one end of the driving spindle in a certain type of pressure fluid operated grinding tool.

Fig. 2 is a section taken on line 2—2 of Fig. 1.

Fig. 3 is an enlarged fragmentary sectional view, similar to Fig. 1, but showing only the lower part of the structure, with the driving spindle removed. The retaining shim appears in place in the bearing assembly seat, while the assembly itself is shown removed from the seat preparatory to shifting it to the right into the final position of Fig. 1.

Fig. 4 is a view similar to Fig. 3, but with the bearing assembly moved to the right to its fully seated position of Fig. 1.

Fig. 5 is a perspective of the annulus or shim removed from the bearing seat.

In the drawing, the invention is illustrated, by way of example, as applied to one of the bearings of a pressure fluid operated grinding wheel of the general type shown in the pending applications of John R. Hoffman, Serial No. 419,417, filed January 8, 1930 (Patent No. 1,864,019, granted June 21, 1932) and Serial No. 548,245, filed July 1, 1931. Applicant makes no claim to such of the features of this tool as are covered by said applications, but only to the improvements in the bearing mounting hereinafter pointed out.

As illustrated, the grinder comprises a casing 11 made up of a head portion 12 and a barrel portion 13. Generally this casing is in the form of a casting made of a comparatively soft metal, such as an aluminum or zinc alloy. Interiorly of head portion 12, and preferably formed integrally therewith, is a plurality of inwardly projecting radial ribs or lugs 14, the ribs being located at the juncture of head portion 12 and barrel portion 13. Each rib 14 is cut away at 16 to form a notch having an inner shoulder 17.

The annular series of notches 16 thus formed provides a seat of uniform internal diameter, in which it is desired to mount securely a ball bearing assembly or unit for supporting the inner end of the driving shaft 18 of the tool (see Figs. 1 and 2). The outer end of shaft 18 is supported in a similar bearing in the grinding wheel end of the tool (not shown). Shaft 18 and the attached grinding wheel are adapted to be driven by pressure fluid acting on a runner (not shown) fixedly mounted on the inner end of shaft 18 to the left of the ball bearing assembly. Exhaust fluid from the runner passes from head portion 12 of the casing between ribs 14 into barrel 13 (as indicated by the arrows), and thence to the atmosphere at the outer end of the tool.

The ball bearing unit illustrated comprises the usual inner ball race 19, outer ball race 21, and a series of balls 22 interposed therebetween. Retaining means 23 are provided for balls 22. Outer ball race 21 is of uniform external diameter. As shown in Fig. 1, inner ball race 19 is secured to shaft 18 by a press fit.

Shaft 18 is made hollow to receive a lubricant and is closed at its inner end by a plug 24. A series of radial ducts 25 in shaft 18 provides for feeding oil therefrom into the ball bearing assembly, as shown in Fig. 1. To prevent the lubricant from being blown out of the bearing, it is provided with an outer washer 26 and an intermediate washer 27, which form an annular space to receive a felt packing 28. Washer 29 closes the inner end of the bearing assembly when it is in place.

Normally, that is, when not using my improved retainer shim or annulus described below, washer 29 is first located against shoulders 17 at the inner end of the bearing assembly seat or bore formed by notches 16. The bearing assembly or unit, the external diameter of which is substantially the same as the internal diameter of the bearing assembly seat, is then pressed into the seat and against washer 29. Thus, the bearing assembly is firmly and rigidly secured in place. In the course of time, however, vibration in the bearing, during operation of the tool, and "growth" of the metal casting forming the tool housing 11 and ribs 14, cause gradual enlargement of the bearing assembly seat and consequent undesirable loosening of the bearing assembly therein.

To prevent this objectionable condition from arising, and to insure absolute tightness of the bearing assembly in its mounting at all times, the present invention provides a novel form of retaining shim or annulus, whereby the assembly may be firmly and rigidly secured in its seat. As appears most clearly from Fig. 5, this shim comprises an annulus 31, which is made from spring metal stock of uniform thickness and provided with a split at 32. As shown in Figs. 3 and 5, annulus 31 is normally curved inwardly in longitudinal section, the curvature extending from the outer end 33 to the inner end 34 of the annulus, and thereby giving it a concavo-convex form. Thus, an annular channel 36 is produced in the outer surface of the annulus, and a corresponding annular, resilient portion 37 on the inner surface thereof. Annulus 31 is of the same size at each end.

When using my retainer shim or annulus 31, it is slipped into the bearing assembly seat against washer 29, as shown in Fig. 3. The greatest external diameter of annulus 31 (the external diameters at outer end 33 and inner end 34 being the same) is slightly greater than the internal diameter of the bearing assembly seat. Split 32 provides for slight compression of ring 31 to permit its insertion into the seat, whereupon the ring expands automatically to hold it in place.

The ball bearing assembly is then forced into annulus 31 until outer ball race 21 abuts washer 29, as shown in Fig. 4. To permit this, the external diameter of outer ball race 21 is made slightly less than the internal diameter of annulus 31 at its outer end 33. The smallest internal diameter of annulus 31, which is at 38 midway between its ends 33, 34, is slightly less than the outside diameter of ball race 21. Hence, as the bearing assembly is forced into place, outer ball race 21 engages with and exerts a wedging or spreading action on the inwardly curved, resilient portion 37 of the annulus. As this action progresses, during the movement of the bearing assembly into the final position of Fig. 4, the longitudinal curvature of annular surface 37 of the shim is reduced, so that it is substantially flattened out between the ends 33, 34 of the annulus, as shown in Fig. 4, this being permitted by split 32 in the annulus.

This brings substantially the entire inner, resilient surface of annulus 31 into intimate contact with the peripheral surface of the bearing assembly, and also places this portion of the annulus under considerable tension, whereby it exerts a strong clamping or gripping action on the unit which it surrounds. Likewise, as the inwardly curved surface 37 of the annulus is flattened out by the insertion of the bearing assembly therein, annular channel 36 is substantially eliminated, and the outer surface of annulus 31, for practically its entire length, forced outwardly into binding contact with the bearing assembly seat.

It is apparent that by using my retainer shim or annulus, the bearing assembly may be rigidly and securely mounted in its seat, with all possibility of loose play between the assembly and its mounting eliminated. Any looseness which might occur because of change in shape or size of the bearing assembly seat, will be immediately and automatically compensated for by the resilient, annular shim, due to its natural tendency to return to its normal undistorted shape of Fig. 3. As a result, the tight binding relation between the bearing assembly, the shim, and the bearing assembly seat and hence the rigid mounting of the bearing assembly is maintained under all conditions.

Obviously, because of its simplicity, the shim may be readily manufactured in large quantities and sold at an extremely reasonable price. This justifies its use in practically all bearing assembly or other mountings where looseness between the mounting and the part supported thereby is likely to occur.

It is not intended to restrict the invention to the exact form of the shim illustrated and described. Various changes, obviously, may be made therein, without departing from the spirit and scope of the invention, except as the same may be limited by the appended claims.

What is claimed is:—

1. The combination of a pair of members, one of which surrounds the other; and a tubular shim interposed between said members to connect them firmly and directly together, said shim comprising a split annulus having a normally inwardly bowed, annular, resilient portion intermediate its ends, the longitudinal curvature of which is substantially eliminated by the engagement of said inner and outer members with the shim so as to secure all of said parts in closely binding, rigid relation with each other.

2. The combination of a pair of members, one of which surrounds the other; and a tubular shim interposed between said members to connect them firmly and directly together, said shim comprising a split annulus of spring metal normally bowed inwardly from end to end to provide an annular, resilient surface, the longitudinal curvature of which is substantially eliminated by the engagement of said inner and outer members with the shim so as to secure all of said parts in closely binding, rigid relation with each other.

3. The combination of a pair of members, one of which surrounds the other; and a tubular shim interposed between said members, said shim comprising an annulus having a tapered, annular, resilient portion which is distorted by the engagement of one of said members therewith to force substantially the entire area of the inner and outer surfaces of the annulus into binding contact with said members to bind all of said parts rigidly together, said resilient portion of the shim tending to return to normal condition whereby to maintain said binding relation of the parts irrespective of any subsequent slight change in size of either of said members.

4. The combination of a pair of concentrically disposed inner and outer members; and a tubular, resilient shim interposed between said members to connect them tightly together, said shim having a normal longitudinal curvature which is substantially flattened out by the engagement of said inner and outer members with the shim so as to force all of said parts into closely binding, rigid relation with each other and provide for maintenance of said binding relation of the parts irrespective of any subsequent slight change in size of either of said members.

5. The combination of a pair of members, one of which surrounds the other; and a tubular shim interposed between said members to connect them firmly and directly together, said shim comprising an annulus provided with a resilient, normally projecting portion which is tensioned and substantially flattened out by the engagement of the inner and outer members with the annulus so as to force all of said parts into closely binding, rigid relation with each other.

6. The combination of a casing having a socket for an anti-friction bearing assembly; an anti-friction bearing assembly mounted in said socket; and a tubular shim interposed between the peripheral surface of said assembly and the surrounding wall of the socket, said shim comprising a split annulus of spring metal having a normal inward curvature in longitudinal section extending from end to end thereof and providing an annular, resilient surface which is flattened out by the engagement of said assembly and said socket wall with the annulus to force substantially all of the opposed peripheral surfaces of said parts into close binding contact with each other to secure the bearing assembly rigidly in said socket.

JOHN E. ERICKSON.